United States Patent [19]

Sunagawa

[11] Patent Number: 5,754,286
[45] Date of Patent: May 19, 1998

[54] METHOD OF IDENTIFYING DEFECTIVE PICTURE ELEMENT IN IMAGE-WISE EXPOSURE APPARATUS

[75] Inventor: Hiroshi Sunagawa, Kanagawa-ken, Japan

[73] Assignee: Fuji Photo Film Co., Ltd., Kanagawa, Japan

[21] Appl. No.: 865,712

[22] Filed: May 30, 1997

[30] Foreign Application Priority Data

May 30, 1996  [JP]  Japan ..................... 8-136629

[51] Int. Cl.$^6$ ..................................................... G01N 21/00
[52] U.S. Cl. ........................................ 356/237; 356/447
[58] Field of Search ..................................... 356/237, 239, 356/445–448, 371, 121, 124, 399–401; 355/35, 37, 66, 18, 77

[56] References Cited

U.S. PATENT DOCUMENTS 4,691,106  9/1987  Hyun et al. ............................. 356/448
5,187,539  2/1993  Adachi et al. ........................... 356/124

*Primary Examiner*—Hoa Q. Pham
*Attorney, Agent, or Firm*—Sughrue, Mion, Zinn, Macpeak & Seas, PLLC

[57] ABSTRACT

In an image-wise exposure apparatus, a mirror array device includes a plurality of small mirrors which are two-dimensionally arrayed and are movable between ON-positions where each of the small mirrors reflects light impinging thereupon along an operative optical path so that the reflected light impinges upon a photosensitive material and OFF-positions where each of the small mirrors reflects light impinging thereupon along an inoperative optical path so that the reflected light does not impinge upon the photosensitive material. An initializing image signal which intends to cause all the small mirrors of the mirror array device to be set in the respective OFF-positions is input into the mirror array device, and an initial amount of light on the operative optical path at the time the initializing image signal is input into the control circuit is measured. Then a series of checking image signals which intend to cause the small mirrors to be set in the respective ON-positions one by one are input into the mirror array device in sequence. When the amount of light on the operative optical path is held substantially equal to the initial amount of the light upon input of a checking image signal, a small mirror corresponding to the checking image signal is identified as a defective one.

4 Claims, 5 Drawing Sheets

METHOD OF IDENTIFYING DEFECTIVE PICTURE ELEMENT IN IMAGE-WISE EXPOSURE APPARATUS

BACKGROUND OF THE INVENTION

1. Field of the Invention

This invention relates to a method of identifying a defective picture element in an image-wise exposure apparatus wherein a photosensitive material is exposed image-wise by use of a mirror array device.

2. Description of the Related Art

As described, for instance, in "O plus E" magazine, the October number, 1994, pp. 90-94, there has been known a mirror array device comprising a plurality of small mirrors which are arranged in the form of a two-dimensional array, and a drive means for changing the orientations of the respective small mirrors independently from each other so that light impinging upon each of the small mirrors is reflected selectively toward one of two directions.

With such a mirror array device, an image can be projected onto a predetermined projection surface via the mirror array device by controlling the drive means according to an image signal to modulate the light impinging upon the projection surface for each of the small mirrors. When a photosensitive material is located on the projection surface, the photosensitive material can be exposed image-wise. (An example of such an image-wise exposure apparatus is disclosed in this applicant's Japanese Patent Application No. 8(1996)-39489.)

Further the amount of light impinging upon the photosensitive material can be controlled for each of the small mirrors by, for instance, pulse width modulation of the on time of each small mirror (i.e., the time each smaller mirror is set in the orientation in which the reflected light from the small mirror is caused to impinge upon the photosensitive material) within a frame time, whereby a gradation image can be formed on the photosensitive material.

In order to obtain an image of a higher quality in an image-wise exposure apparatus using a mirror array device, it is necessary to increase the number of small mirrors, each forming one picture element, per unit area.

However since each small mirror element of the mirror array device is very delicate, one or more of the small mirrors can become immovable in the ON-position, where the light reflected from the small mirror impinge upon the photosensitive material, or the OFF-position, where the light reflected from the small mirror cannot impinge upon the photosensitive material, and become uncontrollable by the image signal.

Especially when the number of small mirrors per unit area is increased in order to improve the image quality, the number of defective picture elements also increases, which deteriorates the image quality.

When one or more small mirrors fail, it is necessary to repair the defective small mirror(s) or to somehow correct the amount of light to be given to the picture element(s) on the photosensitive material corresponding to the defective picture element(s) if the defective picture element(s) is not repaired.

In either case, such defective picture element(s) must be identified.

SUMMARY OF THE INVENTION

In view of the foregoing observations and description, the primary object of the present invention is to provide a method of precisely identifying a defective picture element in an image-wise exposure apparatus using a mirror array device.

In accordance with the present invention, an initializing image signal which intends to cause all the small mirrors of the mirror array device to be set in initial positions which are the same, i.e., all in the respective ON-positions or all in the respective OFF-positions, is input into the mirror array device and then the recording light is projected onto the mirror array device. Then a series of checking image signals which intend to cause the small mirrors to be set in the other positions one by one while holding the other small mirrors in the initial positions are input into the mirror array device in sequence while the recording light is being projected onto the mirror array device. Meanwhile the amount of light on the optical path of the light along which the light reflected from the small mirrors which are in the ON-positions (will be referred to as "the operative optical path", hereinbelow) travels or the optical path of the light along which the light reflected from the small mirrors which are in the OFF-positions (will be referred to as "the inoperative optical path", hereinbelow) travels is monitored.

That is, when one of the small mirrors is defective and immovable in the ON- or OFF-position, the defective small mirror is not moved even if the checking image signal which intends to set the defective small mirror in the other position is input into the mirror array device and accordingly both the amount of light on the operative optical path and that on the inoperative optical path are kept equal to the respective amounts of light in the initial state, the initial state being the state of the small mirrors at the time the initializing image is input into the mirror array device. The amount of light on the operative optical path or the inoperative optical path in the initial state will be referred to as "the initial amount of light", hereinbelow. On the other hand, when a checking image signal which intends to set a normal small mirror in the other position is input into the mirror array device, the normal small mirror is naturally moved to the other position and accordingly the amount of light on the operative optical path and that on the inoperative optical path both change from their respective initial amount of light.

Assuming that some of the small mirrors are immovable in the ON-positions, some of the small mirrors are immovable in the OFF-positions and the initializing image signal is such as to intend to cause all the small mirrors to be set in the ON-positions, the initial amount of light on the operative optical path is the total amount of light reflected from the normal small mirrors and the defective small mirrors immovable in the ON-positions and the initial amount of light on the inoperative optical path is the total amount of light reflected from the defective small mirrors immovable in the OFF-positions. When a checking image signal which intends to set a defective small mirror in the OFF-position is input into the mirror array device, the amounts of light as measured on the operative optical path and the inoperative optical path are both kept equal to the initial amounts of light as measured on the operative optical path and the inoperative optical path irrespective of whether the defective small mirror is immovable in the ON-position or in the OFF-position since no small mirror is moved in this case. On the other hand, when a checking image signal which intends to set a normal small mirror in the OFF-position is input into the mirror array device, the amount of light as measured on the operative optical path becomes smaller than the initial amount of light as measured on the operative optical path while the amount of light as measured on the inoperative optical path becomes larger than the initial amount of light as measured on the inoperative optical path since one small mirror is moved from the ON-position to the OFF-position. Accordingly by monitoring the amount of light on the operative optical path or the inoperative optical path, defective small mirrors can be identified.

The initial image signal may intend to cause all the small mirrors in either of the ON- and OFF-positions and either of the amounts of light on the operative optical path and the inoperative optical path may be monitored.

That is, in accordance with a first aspect of the present invention, there is provided a method of identifying a defective picture element in an image-wise exposure apparatus comprising a light source for emitting recording light to which a photosensitive material is exposed, a mirror array device comprising a plurality of small mirrors which are two-dimensionally arrayed and are movable between ON-positions where each of the small mirrors reflects light impinging thereupon along an operative optical path so that the reflected light impinges upon the photosensitive material and OFF-positions where each of the small mirrors reflects light impinging thereupon along an inoperative optical path so that the reflected light does not impinge upon the photosensitive material and a drive mechanism which sets the respective small mirrors selectively in said ON-positions or in said OFF positions independently of each other, a control circuit which controls the drive mechanism according to an image signal, and an image forming lens which causes light reflected from the mirror array device along the operative optical path to form an image on the photosensitive material, said method of identifying a defective picture element comprising the steps of inputting an initializing image signal which intends to cause all the small mirrors of the mirror array device to be set in the respective OFF-positions into the control circuit of the mirror array device, projecting the recording light onto the mirror array device, measuring an initial amount of light on the operative optical path at the time the initializing image signal is input into the control circuit, inputting a series of checking image signals which intend to cause the small mirrors to be set in the respective ON-positions one by one while holding the other small mirrors in the OFF-positions into the control circuit of the mirror array device in sequence while the recording light is being projected onto the mirror array device, monitoring the amount of light on the operative optical path, and when the amount of light on the operative optical path is held substantially equal to the initial amount of the light upon input of a checking image signal, identifying as a defective one a small mirror corresponding to the checking image signal.

In this case, the amount of light on the operative optical path becomes larger than the initial amount of the light when the small mirror corresponding to the checking image signal input is normal since the number of the small mirrors held in the ON-position increases by one.

In accordance with a second aspect of the present invention, there is provided a method of identifying a defective picture element in an image-wise exposure apparatus comprising a light source for emitting recording light to which a photosensitive material is exposed, a mirror array device comprising a plurality of small mirrors which are two-dimensionally arrayed and are movable between ON-positions where each of the small mirrors reflects light impinging thereupon along an operative optical path so that the reflected light impinges upon the photosensitive material and OFF-positions where each of the small mirrors reflects light impinging thereupon along an inoperative optical path so that the reflected light does not impinge upon the photosensitive material and a drive mechanism which sets the respective small mirrors selectively in said ON-positions or in said OFF positions independently of each other, a control circuit which controls the drive mechanism according to an image signal, and an image forming lens which causes light reflected from the mirror array device along the operative optical path to form an image on the photosensitive material, said method of identifying a defective picture element comprising the steps of inputting an initializing image signal which intends to cause all the small mirrors of the mirror array device to be set in the respective ON-positions into the control circuit of the mirror array device, projecting the recording light onto the mirror array device, measuring an initial amount of light on the operative optical path at the time the initializing image signal is input into the control circuit, inputting a series of checking image signals which intend to cause the small mirrors to be set in the respective OFF-positions one by one while holding the other small mirrors in the ON-positions into the control circuit of the mirror array device in sequence while the recording light is being projected onto the mirror array device, monitoring the amount of light on the operative optical path, and when the amount of light on the operative optical path is held substantially equal to the initial amount of the light upon input of a checking image signal, identifying as a defective one a small mirror corresponding to the checking image signal.

In this case, the amount of light on the operative optical path becomes smaller than the initial amount of the light when the small mirror corresponding to the checking image signal input is normal since the number of the small mirrors held in the ON-position decreases by one.

In accordance with a third aspect of the present invention, there is provided a method of identifying a defective picture element in an image-wise exposure apparatus comprising a light source for emitting recording light to which a photosensitive material is exposed, a mirror array device comprising a plurality of small mirrors which are two-dimensionally arrayed and are movable between ON-positions where each of the small mirrors reflects light impinging thereupon along an operative optical path so that the reflected light impinges upon the photosensitive material and OFF-positions where each of the small mirrors reflects light impinging thereupon along an inoperative optical path so that the reflected light does not impinge upon the photosensitive material and a drive mechanism which sets the respective small mirrors selectively in said ON-positions or in said OFF positions independently of each other, a control circuit which controls the drive mechanism according to an image signal, and an image forming lens which causes light reflected from the mirror array device along the operative optical path to form an image on the photosensitive material, said method of identifying a defective picture element comprising the steps of inputting an initializing image signal which intends to cause all the small mirrors of the mirror array device to be set in the respective ON-positions into the control circuit of the mirror array device, projecting the recording light onto the mirror array device, measuring an initial amount of light on the inoperative optical path at the time the initializing image signal is input into the control circuit, inputting a series of checking image signals which intend to cause the small mirrors to be set in the respective OFF-positions one by one while holding the other small mirrors in the ON-positions into the control circuit of the mirror array device in sequence while the recording light is being projected onto the mirror array device, monitoring the amount of light on the inoperative optical path, and when the amount of light on the inoperative optical path is held substantially equal to the initial amount of the light upon input of a checking image signal, identifying as a defective one a small mirror corresponding to the checking image signal.

In this case, the amount of light on the inoperative optical path becomes larger than the initial amount of the light when the small mirror corresponding to the checking image signal input is normal since the number of the small mirrors held in the OFF-position increases by one.

In accordance with a fourth aspect of the present invention, there is provided a method of identifying a defective picture element in an image-wise exposure apparatus comprising a light source for emitting recording light to which a photosensitive material is exposed, a mirror array device comprising a plurality of small mirrors which are two-dimensionally arrayed and are movable between ON-positions where each of the small mirrors reflects light impinging thereupon along an operative optical path so that the reflected light impinges upon the photosensitive material and OFF-positions where each of the small mirrors reflects light impinging thereupon along an inoperative optical path so that the reflected light does not impinge upon the photosensitive material and a drive mechanism which sets the respective small mirrors selectively in said ON-positions or in said OFF positions independently of each other, a control circuit which controls the drive mechanism according to an image signal, and an image forming lens which causes light reflected from the mirror array device along the operative optical path to form an image on the photosensitive material, said method of identifying a defective picture element comprising the steps of inputting an initializing image signal which intends to cause all the small mirrors of the mirror array device to be set in the respective OFF-positions into the control circuit of the mirror array device, projecting the recording light onto the mirror array device, measuring an initial amount of light on the inoperative optical path at the time the initializing image signal is input into the control circuit, inputting a series of checking image signals which intend to cause the small mirrors to be set in the respective ON-positions one by one while holding the other small mirrors in the OFF-positions into the control circuit of the mirror array device in sequence while the recording light is being projected onto the mirror array device, monitoring the amount of light on the inoperative optical path, and when the amount of light on the inoperative optical path is held substantially equal to the initial amount of the light upon input of a checking image signal, identifying as a defective one a small mirror corresponding to the checking image signal.

In this case, the amount of light on the inoperative optical path becomes smaller than the initial amount of the light when the small mirror corresponding to the checking image signal input is normal since the number of the small mirrors held in the OFF-position decreases by one.

When the initializing image signal is such as to intend to cause all the small mirrors to be set in the ON-positions, the amount of light on the operative optical path is generally large as compared with that on the inoperative optical path in the initial state and when the initializing image signal is such as to intend to cause all the small mirrors to be set in the OFF-positions, the amount of light on the inoperative optical path is generally large as compared with that on the operative optical path in the initial state. Since the amount of light changes only by an amount corresponding to one small mirror, change of the amount of light can be more easily detected as the level of the initial amount of light is lower. Accordingly, it is preferred that the amount of light be monitored on the operative optical path when the initializing image signal is such as to intend to cause all the small mirrors to be set in the OFF-positions, and the amount of light be monitored on the inoperative optical path when the initializing image signal is such as to intend to cause all the small mirrors to be set in the ON-positions.

When a small mirror is immovable in the OFF-position, the picture element on the photosensitive material corresponding to the defective small mirror is not exposed to light irrespective of the image signal. However such a picture element can be interpolated, for instance, by picture element shifting which we have disclosed, for instance, in Japanese Patent Application No. 8(1996)-39489.

When a small mirror is immovable in the ON-position, the picture element on the photosensitive material corresponding to the small mirror is kept exposed to light irrespective of the image signal. In such a case, the defective small mirror is forced to the OFF-position and fixed there. Then the picture element on the photosensitive material corresponding to the defective small mirror can be interpolated, for instance, by picture element shifting described above.

Prior to identifying defective small mirrors in accordance with the present invention, it is preferred that the small mirrors on the mirror array device be divided into a plurality of groups and what group includes defective small mirrors be detected roughly. For example the small mirrors are divided into a plurality of groups by the line, column or the region each including the same number of small mirrors. Then an image signal which intends to set all the small mirrors in each group to one of the ON- and OFF-positions is input into the control circuit of the mirror array device and the amount of light on one of the operative optical path and the inoperative optical path is measured. Thereafter an image signal which intends to set all the small mirrors in the group to the other positions at one time is input into the control circuit of the mirror array device and the amount of light on the same optical path is measured. When the difference between the amounts of light is not larger than a predetermined value, it is determined that the group of the small mirrors includes defective small mirrors.

Then the method of the procedure of identifying defective picture element ion accordance with the present invention may be carried out only on the groups of small mirrors which have been determined to include defective small mirrors.

DESCRIPTION OF THE PREFERRED EMBODIMENT

Figure 1:
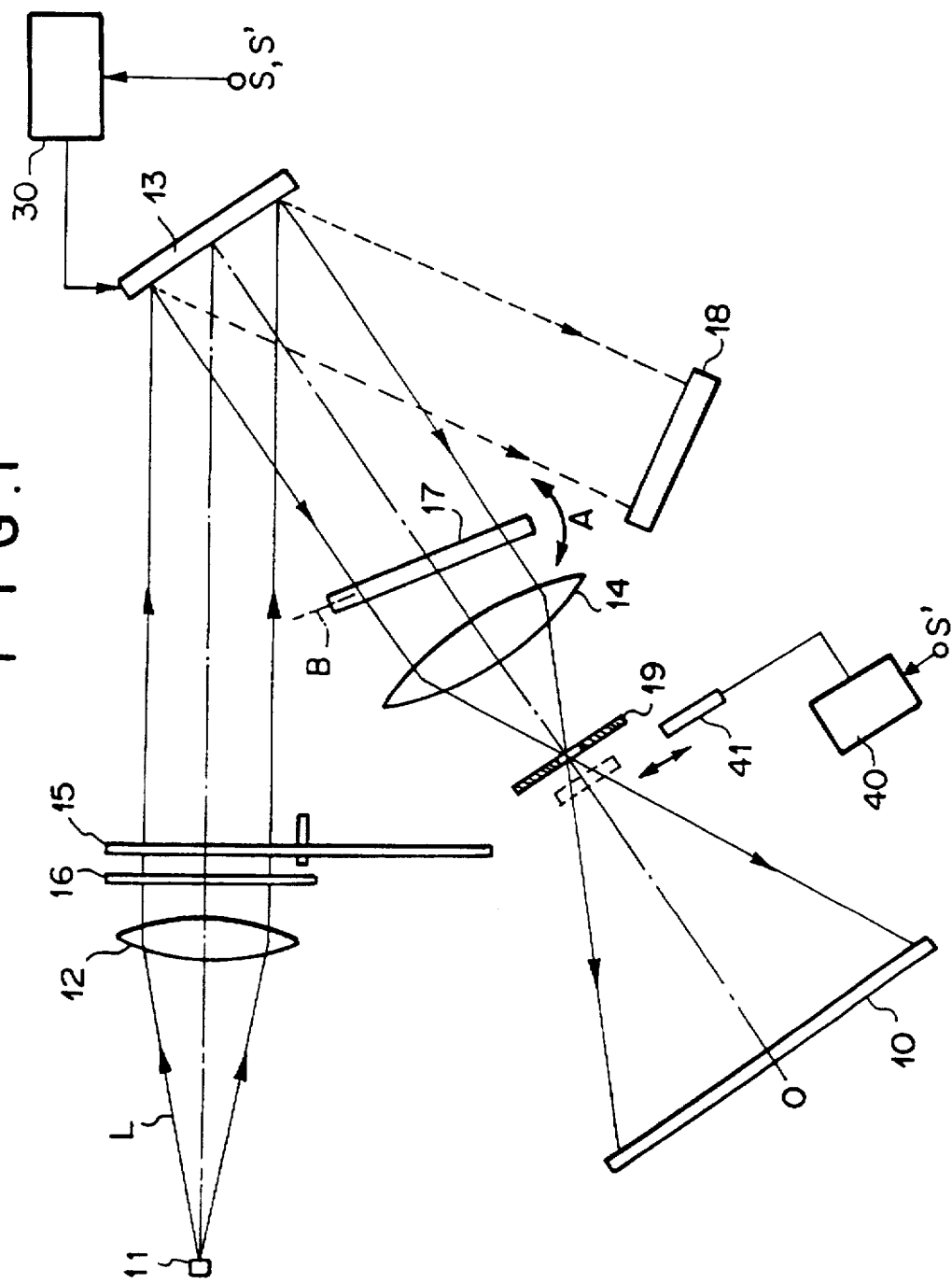
FIG. 1 is a plan view showing an image-wise exposure apparatus provided with a system for carrying out a method of identifying defective picture elements in accordance with first and second embodiments of the present invention.

In FIG. 1, an image-wise exposure apparatus comprises a light source 11 such as a halogen lamp which emits white recording light L to which a color photosensitive material 10 is to be exposed and a converging lens 12 which is located so that the light source 10 is in the vicinity of the focal point of the converging lens 12. The converging lens 12 collimates the recording light L from the light source 10. The image-wise exposure apparatus further comprises a mirror array device 13 positioned so that the collimated recording light L impinges upon the mirror array device 13, an image forming lens 14 positioned so that the recording light L reflected by the mirror array device 13 along the operative optical path enters the image forming lens 14 and a color filter 15 and a black shutter 16 which are inserted into the optical path of the recording light L upstream of the mirror array device 13.

A plane-parallel plate 17 for carrying out picture element shifting is disposed between the mirror array device 13 and the image forming lens 14. The plane-parallel plate 17 is rotated in directions shown by double headed arrow A in FIG. 1 and about a rotational axis B by a rotary mechanism not shown.

A light absorbing member 18 is disposed to absorb light reflected from the mirror array device 13 along the inoperative optical path. An aperture stop 19 is disposed where the light reflected from the mirror array device 13 along the operative optical path is focused by the image forming lens 14 between the mirror array device 13 and the photosensitive material 10 and limits the beam diameter of the light from the image forming lens 14 to a predetermined value.

A photodetector 41 is disposed just downstream of the aperture stop 19 to be movable between a detecting position where it receives the whole light emanating from the aperture stop 19 and a retracted position where it receives none of the light. A defective picture element identifying means 40 which identifies a defective small mirror (defective picture element) out of a plurality of small mirrors in the mirror array device 13 on the basis of the output of the photodetector 41 and a scanning signal S' to be described later is connected to the photodetector 41. The identifying means 40 need not be built in the image-wise exposure apparatus but may be set to the image-wise exposure apparatus as needed.

The photodetector 41 is normally held in the retracted position.

Figure 2:
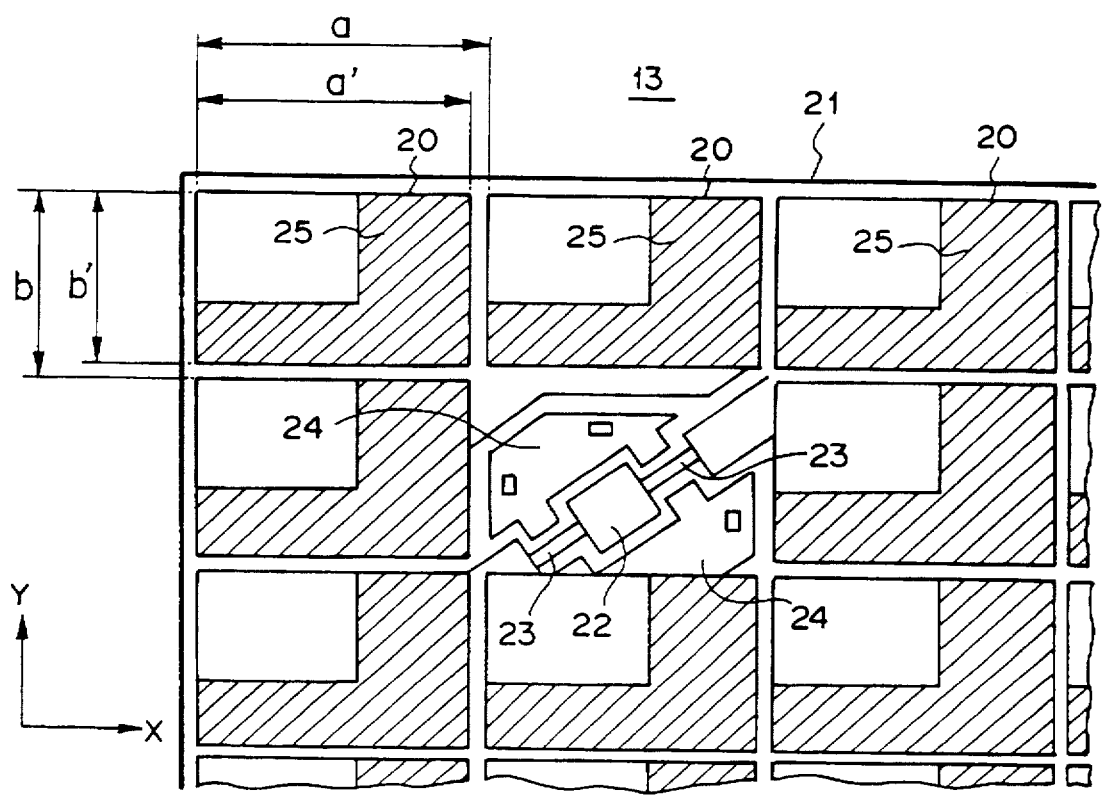
FIG. 2 is a front view partly cutaway of a mirror array device employed in the image-wise exposure apparatus.

As shown in FIG. 2, the mirror array device 13 comprises a plurality of small mirrors 20 two-dimensionally arranged (in X- and Y-directions normal to each other) on a silicone substrate 21. Each small mirror 20 is of aluminum alloy or the like and rectangular in shape. The small mirrors 20 are arranged at pitches a, e.g., 17 μm, in X-direction and at pitches b, e.g., 17 μm, in Y-direction. The size a' of each of the small mirrors 20 as measured in X-direction and the size b' of each of the small mirrors 20 as measured in Y-direction are sufficiently close respectively to the mirror pitches a and b in X- and Y-directions.

In FIG. 2, a small mirror 20 at the center is removed to show a drive mechanism for the small mirror 20. Each of the small mirrors 20 in the mirror array device 13 is provided with such a drive mechanism. As shown in FIG. 2, the drive mechanism comprises a yoke 22 which supports the small mirror 20 by way of a support pin (not shown), a pair of torsion hinges 23 which support the yoke 22, a pair of address electrodes 24 and a bias bus (not shown) disposed below these elements. The orientation of the torsion hinges 23 is changed by electrostatic force produced by an electric voltage applied to the address electrodes 24.

Each of the small mirrors 20 is provided with an antireflective mask 25 for limiting the effective aperture of the small mirror 20.

Voltage application to the address electrodes 24 for each small mirror 20 is controlled by a control circuit 30 (FIG. 1) which receives an image signal representing a gradation image. That is, when no voltage is applied to the electrodes 24, the hinges 23 (accordingly the small mirror 20) is held in parallel to the substrate 21. When an electric voltage of a predetermined polarity is applied to one of the electrodes 24 and a complimentary voltage of the reverse polarity is applied to the other electrode 24, the small mirror 20 is inclined by angle −θ relative to the substrate surface as shown in FIG. 3, and when the reverse voltages are applied to the electrodes 24, the small mirror 20 is inclined by angle θ relative to the substrate surface as shown in FIG. 4.

Figure 3:
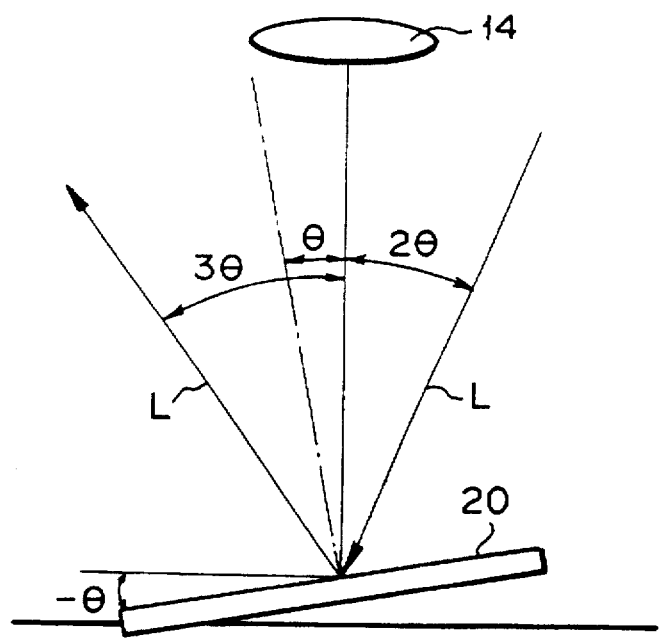
FIG. 3 is a side view showing the state of a small mirror in the mirror array device when it is in the OFF-position.
Figure 4:
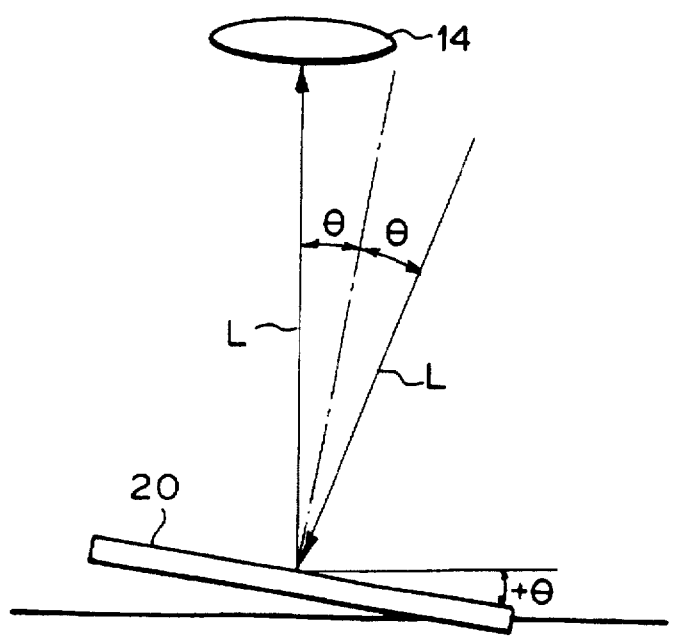
FIG. 4 is a side view showing the state of a small mirror in the mirror array device when it is in the ON-position.

When the small mirror 20 is in the position shown in FIG. 3, the recording light L reflected by the small mirror 20 cannot enter the image forming lens 14 and when the small mirror 20 is in the position shown in FIG. 4, the recording light L reflected by the small mirror 20 enters the image forming lens 14 and impinges upon the photosensitive material 10. Thus whether the recording light L impinges upon the photosensitive material 10 can be controlled small mirror by small mirror. The position of the small mirror 20 shown in FIG. 3 will be referred to as "OFF-position" and that shown in FIG. 4 will be referred to as "ON-position", hereinbelow. By controlling the ON time of each small mirror 20 (the time for which the small mirror 20 is in the ON-position) according to an image signal S, for instance, by pulse width modulation, the amount of the recording light L impinging upon the photosensitive material 10 is controlled for each small mirror 20, whereby a gradation image is formed on the photosensitive material 10.

In FIGS. 3 and 4, the image forming lens 14 is shown only for the purpose of showing the angular aperture of the image forming lens 14 and the size and position of the image forming lens 14 are different from the actual size and position.

The color filter 15 comprises red, green and blue filters. The red, green and blue filters are inserted into the optical path of the recording light L in sequence. While one of the filters is in the optical path of the recording light L, the mirror array device 13 is driven according to the color image signal corresponding to the color of the inserted filter. While the filter is switched, all the small mirrors 20 are kept in the OFF-position. Thus the color photosensitive material 10 is sequentially exposed to the modulated red, green and blue lights, whereby a color latent image is recorded on the color photosensitive material 10.

The recording light L reflected by the small mirrors 20 in the OFF-position is absorbed by the light absorbing member 18.

When some of the small mirrors 20 are defective and immovable in the ON- or OFF-positions, the picture elements on the photosensitive material 10 corresponding to the defective small mirrors become unnatural in density and brightness. When such unnatural picture elements are found, the defective small mirrors should be identified first.

When identifying defective small mirrors, the photodetector 41 is moved to the detecting position as shown by the broken line in FIG. 1.

Then an initializing image signal S which intends to cause all the small mirrors 20 of the mirror array device 13 to be set in the respective OFF-positions into the control circuit 30 of the mirror array device 13. The state at this time will be referred to as "the initial state", hereinbelow.

In the initial state, normal small mirrors 20 are naturally in the OFF-positions and at the same time, defective small mirrors 20 which are immovable in the OFF-positions are also in the OFF-positions though defective small mirrors 20 which are immovable in the ON-positions are in the ON-positions.

In the initial state, recording light is projected onto the mirror array device 13 and the photodetector 41 detects the amount of light travelling along the operative optical path, that is, the amount of light reflected from the small mirrors 20 which are immovable in the ON-positions. The amount of light detected by the photodetector 41 in this state will be referred to as "the initial amount of light L1", hereinbelow.

Then a scanning signal S' which intends to cause the small mirrors 20 to be set in the respective ON-positions one by one while holding the other small mirrors in the OFF-positions is input into the control circuit 30 of the mirror array device 13 while the recording light is kept projected onto the mirror array device 13.

Figure 5A:
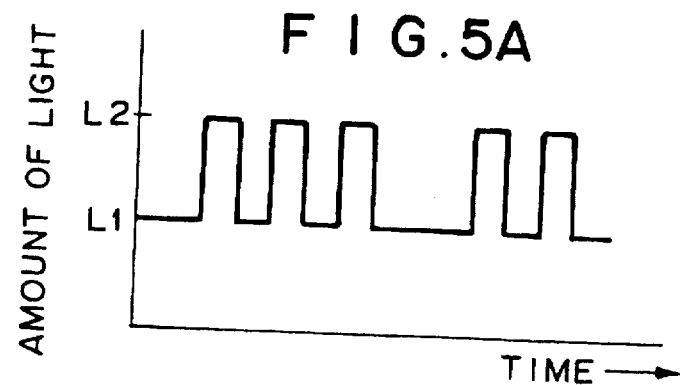
FIG. 5A is a graph showing the change in the amount of light detected by the photodetector in the first and third embodiments of the present invention.

So long as the small mirror 20 designated by the scanning signal S' is normal, the small mirror 20 is moved to the ON-position from the OFF-position and the number of the small mirrors 20 in the ON-positions increases by one. Accordingly at this time, the amount of light detected by the photodetector 41 is increased to a value L2 (FIG. 5A) which is larger than the initial amount of light L1 by an amount corresponding to the amount of light reflected by one small mirror 20. However when the small mirror 20 designated by the scanning signal S' is immovable in the OFF-position, the small mirror 20 is not moved to the ON-position and the number of the small mirrors 20 in the ON-positions is held unchanged. Accordingly at this time, the amount of light detected by the photodetector 41 is held substantially equal to the initial amount of light L1. Similarly when the small mirror 20 designated by the scanning signal S' is immovable in the ON-position, the number of the small mirrors 20 in the ON-positions is held unchanged since the small mirror 20 designated by the scanning signal S' has been there. Accordingly also at this time, the amount of light detected by the photodetector 41 is held substantially equal to the initial amount of light L1. As can be understood from the description above, the small mirror 20 designated by the scanning signal S' when the amount of light detected by the photodetector 41 is held substantially equal to the initial amount of light L1 is defective and is immovable in the ON- or OFF-position.

The identifying means 40 identifies defective small mirrors 20 on the basis of the relation between the scanning time and the amount of light detected by the photodetector 41 in synchronization with the scanning signal S' input into the control circuit 30.

When one or more small mirrors 20 fail, it is necessary to repair the defective small mirror(s) 20 or to somehow correct the amount of light to be given to the picture element(s) on the photosensitive material corresponding to the defective picture element(s) 20 if the defective picture element(s) 20 is not repaired.

For example, when a small mirror 20 is immovable in the ON-position, the picture element on the photosensitive material corresponding to the small mirror 20 is kept exposed to light irrespective of the image signal. In such a case, the defective small mirror 20 is forced to the OFF-position and fixed there. When a small mirror 20 is fixed in the OFF-position or is immovable in the OFF-position, no light impinges upon the picture element on the photosensitive material 10 corresponding to the defective small mirror 20 and the picture element becomes a missing picture element.

Such a missing picture element on the photosensitive material corresponding to the defective small mirror can be interpolated, for instance, by picture element shifting using the plane-parallel plate 17 disclosed in this applicant's Japanese Patent Application No. 8(1996)-39489.

For example, the defective small mirror 20 which is immovable in the ON-position can be forced to the OFF-position and fixed therein the following ways.

1) An electron beam is projected onto the defective small mirror 20 to force the small mirror 20 to the OFF-position under Coulomb force and a laser beam is projected onto the small mirror 20 to fix it in the OFF-position.

2) The defective small mirror 20 is mechanically forced to the OFF-position, for instance, by a thin needle and a laser beam is projected onto the small mirror 20 to fix it in the OFF-position.

Instead of forcing the defective mirror 20 to the OFF-position, the defective small mirror 20 may be nullified, for instance, by burning out the defective small mirror 20 by a laser beam.

Though, in the embodiment described above, an initializing image signal S which intends to cause all the small mirrors 20 of the mirror array device 13 to be set in the respective OFF-positions into the control circuit 30 of the mirror array device 13, that is, all the normal small mirrors 20 as well as defective small mirrors immovable in the OFF-positions are held in the OFF-positions in the initial state, the normal small mirrors 20 may be held in the ON-positions in the initial state.

Now a second embodiment of the present invention where an initializing image signal S which intends to cause all the small mirrors 20 of the mirror array device 13 to be set in the respective ON-positions into the control circuit 30 of the mirror array device 13 and defective small mirrors are identified on the basis of the amount of light measured on the operative optical path will be described, hereinbelow.

In this embodiment, the photodetector 41 receives the amount of light reflected from the normal small mirrors 20 and the defective small mirrors 20 which are immovable in the ON-positions in the initial state. In this case, the initial amount of light L1 is the amount of light reflected from the normal small mirrors 20 and the defective small mirrors 20 which are immovable in the ON-positions.

Then a scanning signal S' which intends to cause the small mirrors 20 to be set in the respective OFF-positions one by one while holding the other small mirrors in the ON-positions is input into the control circuit 30 of the mirror array device 13 while the recording light is kept projected onto the mirror array device 13.

Figure 5B:
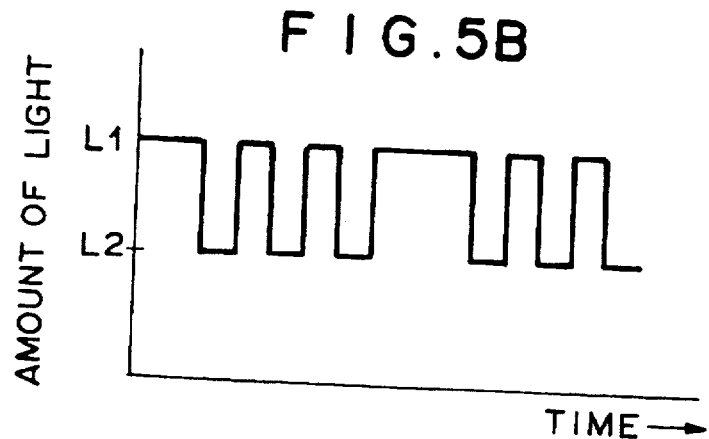
FIG. 5B is a graph showing the change in the amount of light detected by the photodetector in the second and fourth embodiments of the present invention.

So long as the small mirror 20 designated by the scanning signal S' is normal, the small mirror 20 is moved to the OFF-position from the ON-position and the number of the small mirrors 20 in the ON-positions decreases by one. Accordingly at this time, the amount of light detected by the photodetector 41 is reduced to a value L2 (FIG. 5B) which is smaller than the initial amount of light L1 by an amount corresponding to the amount of light reflected by one small mirror 20. However when the small mirror 20 designated by the scanning signal S' is immovable in the ON-position, the small mirror 20 is not moved to the OFF-position and the number of the small mirrors 20 in the ON-positions is held unchanged. Accordingly at this time, the amount of light detected by the photodetector 41 is held substantially equal to the initial amount of light L1. Similarly when the small mirror 20 designated by the scanning signal S' is immovable in the OFF-position, the number of the small mirrors 20 in the ON-positions is held unchanged since the small mirror 20 designated by the scanning signal S' has not been there. Accordingly also at this time, the amount of light detected by the photodetector 41 is held substantially equal to the initial amount of light L1.

The identifying means 40 identifies defective small mirrors 20 on the basis of the relation between the scanning time and the amount of light detected by the photodetector 41 in synchronization with the scanning signal S' input into the control circuit 30.

The amount of light on the operative optical path in the initial state is generally larger when the initializing image signal S is such as to intend to cause all the small mirrors 20 to be set in the ON-positions than when the initializing image signal S is such as to intend to cause all the small mirrors 20 to be set in the OFF-positions. Since the amount of light changes only by an amount corresponding to one small mirror, change of the amount of light can be more easily detected as the level of the initial amount of light is lower. From this point of view, the first embodiment is advantageous over the second embodiment.

Figure 7:
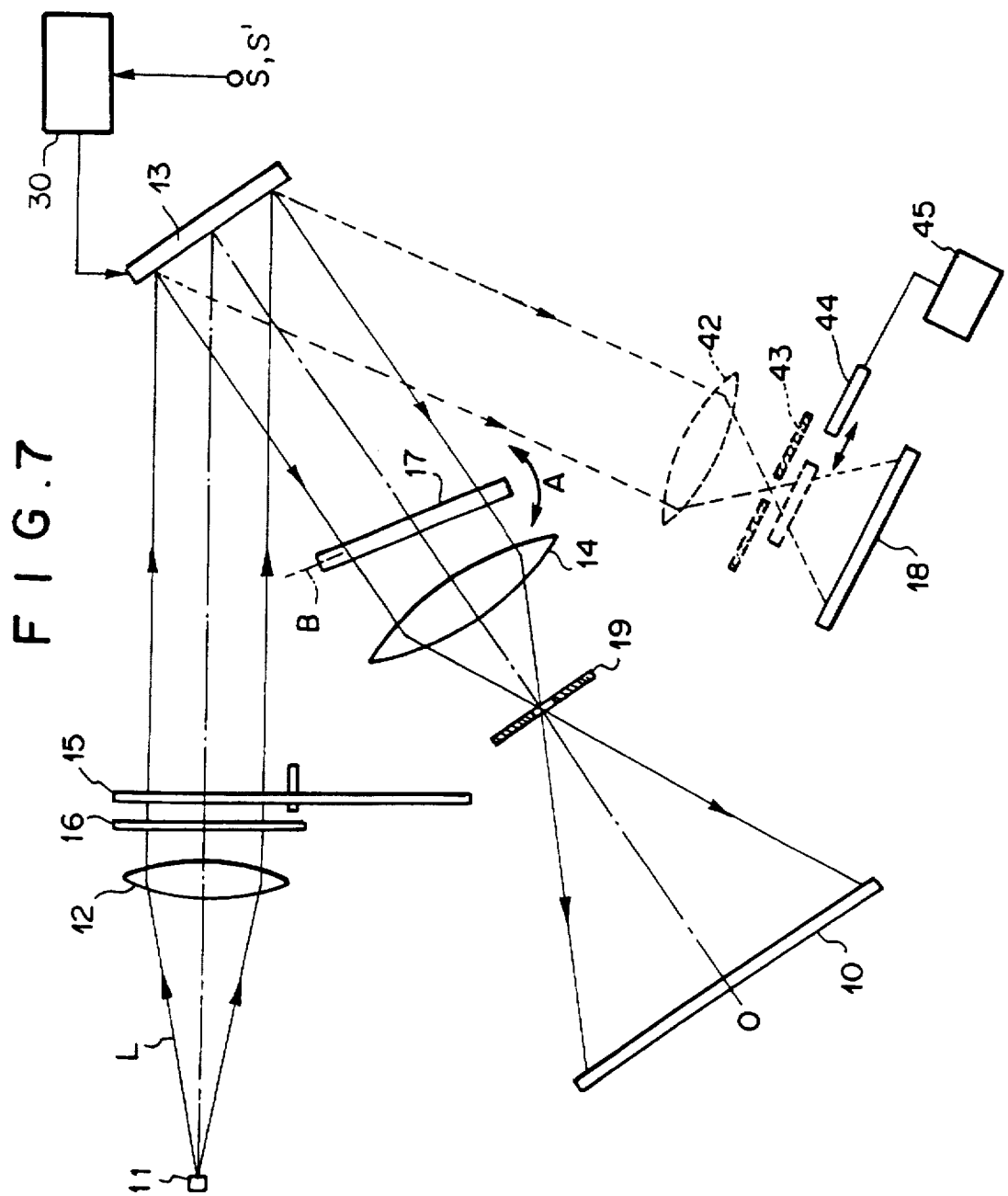
FIG. 7 is a plan view showing an image-wise exposure apparatus provided with a system for carrying out a method of identifying defective picture elements in accordance with third and fourth embodiments of the present invention.

A third embodiment of the present invention will be described with reference to FIG. 7, hereinbelow. In this embodiment, defective small mirrors are identified on the basis of change in the amount of light on the inoperative optical path. For this purpose, a condenser lens 42 is disposed just upstream of the light absorbing member 18 and an aperture stop 43 is disposed where the light reflected from the mirror array device 13 along the inoperative optical path is focused by the condenser lens 42 as shown in FIG. 7. A photodetector 44 is disposed just downstream of the aperture stop 43 to be movable between a detecting position where it receives the whole light emanating from the aperture stop 43 and a retracted position where it receives none of the light. A defective picture element identifying means 45 which indentifies a defective small mirror (defective picture element) out of a plurality of small mirrors in the mirror array device 13 on the basis of the output of the photodetector 44 and a scanning signal S' to be described later is connected to the photodetector 44.

When identifying defective small mirrors, the photodetector 44 is moved to the detecting position as shown by the broken line in FIG. 7.

Then an initializing image signal S which intends to cause all the small mirrors 20 of the mirror array device 13 to be set in the respective ON-positions into the control circuit 30 of the mirror array device 13.

In the initial state, normal small mirrors 20 are naturally in the ON-positions and at the same time, defective small mirrors 20 which are immovable in the ON-positions are also in the ON-positions though defective small mirrors 20 which are immovable in the OFF-positions are in the OFF-positions.

In the initial state, recording light is projected onto the mirror array device 13 and the photodetector 44 detects the amount of light travelling along the inoperative optical path, that is, the amount of light reflected from the small mirrors 20 which are immovable in the OFF-positions.

Then a scanning signal S' which intends to cause the small mirrors 20 to be set in the respective OFF-positions one by one while holding the other small mirrors in the ON-positions is input into the control circuit 30 of the mirror array device 13 while the recording light is kept projected onto the mirror array device 13.

So long as the small mirror 20 designated by the scanning signal S' is normal, the small mirror 20 is moved to the OFF-position from the ON-position and the number of the small mirrors 20 in the OFF-positions increases by one. Accordingly at this time, the amount of light detected by the photodetector 44 is increased to a value L2 (FIG. 5A) which is larger than the initial amount of light L1 by an amount corresponding to the amount of light reflected by one small mirror 20. However when the small mirror 20 designated by the scanning signal S' is immovable in the ON-position, the small mirror 20 is not moved to the OFF-position and the number of the small mirrors 20 in the OFF-positions is held unchanged. Accordingly at this time, the amount of light detected by the photodetector 44 is held substantially equal to the initial amount of light L1. Similarly when the small mirror 20 designated by the scanning signal S' is immovable in the OFF-position, the number of the small mirrors 20 in the OFF-positions is held unchanged since the small mirror 20 designated by the scanning signal S' has been there. Accordingly also at this time, the amount of light detected by the photodetector 44 is held substantially equal to the initial amount of light L1.

The identifying means 45 identifies defective small mirrors 20 on the basis of the relation between the scanning time and the amount of light detected by the photodetector 44 in synchronization with the scanning signal S' input into the control circuit 30.

Though, in the third embodiment described above, an initializing image signal S which intends to cause all the small mirrors 20 of the mirror array device 13 to be set in the respective ON-positions into the control circuit 30 of the mirror array device 13, that is, all the normal small mirrors 20 as well as defective small mirrors immovable in the ON-positions are held in the ON-positions in the initial state, the normal small mirrors 20 may be held in the OFF-positions in the initial state.

Now a fourth embodiment of the present invention where an initializing image signal S which intends to cause all the small mirrors 20 of the mirror array device 13 to be set in the respective OFF-positions into the control circuit 30 of the mirror array device 13 and defective small mirrors are identified on the basis of the amount of light measured on the inoperative optical path will be described, hereinbelow.

In this embodiment, the photodetector 44 receives the amount of light reflected from the normal small mirrors 20 and the defective small mirrors 20 which are immovable in the OFF-positions in the initial state. In this case, the initial amount of light L1 is the amount of light reflected from the normal small mirrors 20 and the defective small mirrors 20 which are immovable in the OFF-positions.

Then a scanning signal S' which intends to cause the small mirrors 20 to be set in the respective ON-positions one by one while holding the other small mirrors in the OFF-positions is input into the control circuit 30 of the mirror array device 13 while the recording light is kept projected onto the mirror array device 13.

So long as the small mirror 20 designated by the scanning signal S' is normal, the small mirror 20 is moved to the ON-position from the OFF-position and the number of the small mirrors 20 in the OFF-positions decreases by one. Accordingly at this time, the amount of light detected by the photodetector 44 is reduced to a value L2 (FIG. 5B) which is smaller than the initial amount of light L1 by an amount corresponding to the amount of light reflected by one small mirror 20. However when the small mirror 20 designated by the scanning signal S' is immovable in the OFF-position, the small mirror 20 is not moved to the ON-position and the number of the small mirrors 20 in the OFF-positions is held unchanged. Accordingly at this time, the amount of light detected by the photodetector 44 is held substantially equal to the initial amount of light L1. Similarly when the small mirror 20 designated by the scanning signal S' is immovable in the ON-position, the number of the small mirrors 20 in the OFF-positions is held unchanged since the small mirror 20 designated by the scanning signal S' has not there. Accordingly also at this time, the amount of light detected by the photodetector 44 is held substantially equal to the initial amount of light L1.

The identifying means 45 identifies defective small mirrors 20 on the basis of the relation between the scanning time and the amount of light detected by the photodetector 44 in synchronization with the scanning signal S' input into the control circuit 30.

Figure 6A:
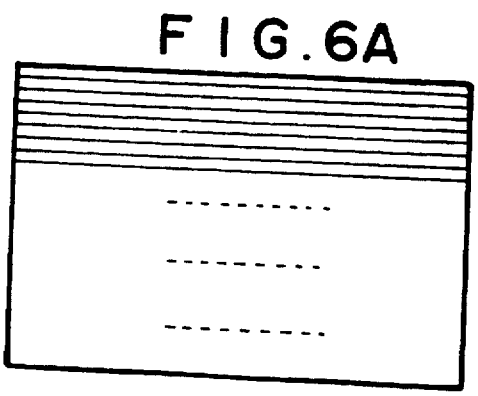
FIG. 6A is a view showing an example of groups of the small mirrors into which the small mirrors of the mirror array device are divided when a region including defective small mirrors is roughly detected.
Figure 6B:
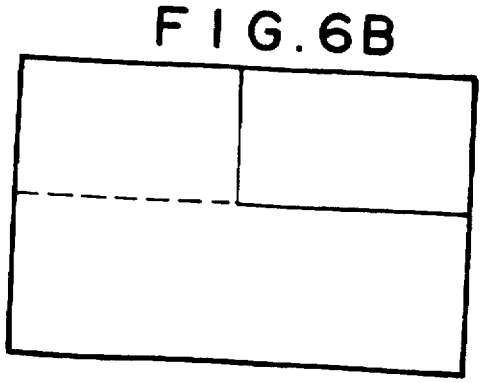
FIG. 6B is a view showing another example of groups of the small mirrors into which the small mirrors of the mirror array device are divided when a region including defective small mirrors is roughly detected.

If desired, the small mirrors on the mirror array device may be divided into a plurality of groups and what group includes defective small mirrors may be detected roughly prior to identifying defective small mirrors in accordance with the first, second, third or the fourth embodiment of the present invention. For example the small mirrors 20 are divided into a plurality of groups by the scanning line as shown in FIG. 6A or the region as shown in FIG. 6B each including the same number of small mirrors 20. Then an image signal which intends to set all the small mirrors 20 in each group to one of the ON- and OFF-positions is input into the control circuit 30 of the mirror array device 13 and the amount of light on one of the operative optical path and the inoperative optical path is measured. Thereafter an image signal which intends to set all the small mirrors 20 in the group to the other positions at one time is input into the control circuit 30 of the mirror array device 13 and the amount of light on the same optical path is measured. When the difference between the amounts of light is not larger than a predetermined value, it is determined that the group of the small mirrors 20 includes defective small mirrors.

Then the method of the procedure of identifying defective picture element ion accordance with the present invention may be carried out only on the groups of small mirrors 20 which have been determined to include defective small mirrors.

What is claimed is:

1. A method of identifying a defective picture element in an image-wise exposure apparatus comprising a light source for emitting recording light to which a photosensitive material is exposed, a mirror array device comprising a plurality of small mirrors which are two-dimensionally arrayed and are movable between ON-positions where each of the small mirrors reflects light impinging thereupon along an operative optical path so that the reflected light impinges upon the photosensitive material and OFF-positions where each of the small mirrors reflects light impinging thereupon along an inoperative optical path so that the reflected light does not impinge upon the photosensitive material and a drive mechanism which sets the respective small mirrors selectively in said ON-positions or in said OFF positions independently of each other, a control circuit which controls the drive mechanism according to an image signal, and an image forming lens which causes light reflected from the mirror array device along the operative optical path to form an image on the photosensitive material, said method of identifying a defective picture element comprising the steps of inputting an initializing image signal which intends to cause all the small mirrors of the mirror array device to be set in the respective OFF-positions into the control circuit of the mirror array device, projecting the recording light onto the mirror array device, measuring an initial amount of light on the operative optical path at the time the initializing image signal is input into the control circuit, inputting a series of checking image signals which intend to cause the small mirrors to be set in the respective ON-positions one by one while holding the other small mirrors in the OFF-positions into the control circuit of the mirror array device in sequence while the recording light is being projected onto the mirror array device, monitoring the amount of light on the operative optical path, and when the amount of light on the operative optical path is held substantially equal to the initial amount of the light upon input of a checking image signal, identifying as a defective one a small mirror corresponding to the checking image signal.

2. A method of identifying a defective picture element in an image-wise exposure apparatus comprising a light source for emitting recording light to which a photosensitive material is exposed, a mirror array device comprising a plurality of small mirrors which are two-dimensionally arrayed and are movable between ON-positions where each of the small mirrors reflects light impinging thereupon along an operative optical path so that the reflected light impinges upon the photosensitive material and OFF-positions where each of the small mirrors reflects light impinging thereupon along an inoperative optical path so that the reflected light does not impinge upon the photosensitive material and a drive mechanism which sets the respective small mirrors selectively in said ON-positions or in said OFF positions independently of each other, a control circuit which controls the drive mechanism according to an image signal, and an image forming lens which causes light reflected from the mirror array device along the operative optical path to form an image on the photosensitive material, said method of identifying a defective picture element comprising the steps of inputting an initializing image signal which intends to cause all the small mirrors of the mirror array device to be set in the respective ON-positions into the control circuit of the mirror array device, projecting the recording light onto the mirror array device, measuring an initial amount of light on the operative optical path at the time the initializing image signal is input into the control circuit, inputting a series of checking image signals which intend to cause the small mirrors to be set in the respective OFF-positions one by one while holding the other small mirrors in the ON-positions into the control circuit of the mirror array device in sequence while the recording light is being projected onto the mirror array device, monitoring the amount of light on the operative optical path, and when the amount of light on the operative optical path is held substantially equal to the initial amount of the light upon input of a checking image signal, identifying as a defective one a small mirror corresponding to the checking image signal.

3. A method of identifying a defective picture element in an image-wise exposure apparatus comprising a light source for emitting recording light to which a photosensitive material is exposed, a mirror array device comprising a plurality of small mirrors which are two-dimensionally arrayed and are movable between ON-positions where each of the small mirrors reflects light impinging thereupon along an operative optical path so that the reflected light impinges upon the photosensitive material and OFF-positions where each of the small mirrors reflects light impinging thereupon along an inoperative optical path so that the reflected light does not impinge upon the photosensitive material and a drive mechanism which sets the respective small mirrors selectively in said ON-positions or in said OFF positions independently of each other, a control circuit which controls the drive mechanism according to an image signal, and an image forming lens which causes light reflected from the mirror array device along the operative optical path to form an image on the photosensitive material, said method of identifying a defective picture element comprising the steps of inputting an initializing image signal which intends to cause all the small mirrors of the mirror array device to be set in the respective ON-positions into the control circuit of the mirror array device, projecting the recording light onto the mirror array device, measuring an initial amount of light on the inoperative optical path at the time the initializing image signal is input into the control circuit, inputting a series of checking image signals which intend to cause the small mirrors to be set in the respective OFF-positions one by one while holding the other small mirrors in the ON-positions into the control circuit of the mirror array device in sequence while the recording light is being projected onto the mirror array device, monitoring the amount of light on the inoperative optical path, and when the amount of light on the inoperative optical path is held substantially equal to the initial amount of the light upon input of a checking image signal, identifying as a defective one a small mirror corresponding to the checking image signal.

4. A method of identifying a defective picture element in an image-wise exposure apparatus comprising a light source for emitting recording light to which a photosensitive material is exposed, a mirror array device comprising a plurality of small mirrors which are two-dimensionally arrayed and are movable between ON-positions where each of the small mirrors reflects light impinging thereupon along an operative optical path so that the reflected light impinges upon the photosensitive material and OFF-positions where each of the small mirrors reflects light impinging thereupon along an inoperative optical path so that the reflected light does not impinge upon the photosensitive material and a drive mechanism which sets the respective small mirrors selectively in said ON-positions or in said OFF positions independently of each other, a control circuit which controls the drive mechanism according to an image signal, and an image forming lens which causes light reflected from the mirror array device along the operative optical path to form an image on the photosensitive material, said method of identifying a defective picture element comprising the steps of inputting an initializing image signal which intends to cause all the small mirrors of the mirror array device to be set in the respective OFF-positions into the control circuit of the mirror array device, projecting the recording light onto the mirror array device, measuring an initial amount of light on the inoperative optical path at the time the initializing image signal is input into the control circuit, inputting a series of checking image signals which intend to cause the small mirrors to be set in the respective ON-positions one by one while holding the other small mirrors in the OFF-positions into the control circuit of the mirror array device in sequence while the recording light is being projected onto the mirror array device, monitoring the amount of light on the inoperative optical path, and when the amount of light on the inoperative optical path is held substantially equal to the initial amount of the light upon input of a checking image signal, identifying as a defective one a small mirror corresponding to the checking image signal.

* * * * *